United States Patent
Utsumi et al.

(10) Patent No.: US 7,345,394 B2
(45) Date of Patent: Mar. 18, 2008

(54) DYNAMOELECTRIC CLAW-SHAPED ROTOR WITH MAGNET RETAINER

(75) Inventors: Yoshinobu Utsumi, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/736,791

(22) Filed: Apr. 18, 2007

(65) Prior Publication Data

US 2007/0182275 A1    Aug. 9, 2007

Related U.S. Application Data

(62) Division of application No. 10/999,958, filed on Dec. 1, 2004, now Pat. No. 7,259,489.

(30) Foreign Application Priority Data

Jan. 12, 2003    (JP) .............................. 2003-402000

(51) Int. Cl.
*H02K 21/04* (2006.01)
*H02K 21/14* (2006.01)
(52) U.S. Cl. .................. 310/156.72; 310/261; 310/263
(58) Field of Classification Search ........... 310/156.08, 310/156.66, 156.72, 192, 261, 263, 257
See application file for complete search history.

(56) References Cited

U.S. PATENT DOCUMENTS

| | | | |
|---|---|---|---|
| 5,306,977 A | 4/1994 | Hayashi | |
| 5,483,116 A | 1/1996 | Kusase et al. | |
| 5,578,885 A | 11/1996 | Alford et al. | |
| 5,925,964 A | 7/1999 | Kusase et al. | |
| 5,973,435 A | 10/1999 | Irie et al. | |
| 6,002,194 A | 12/1999 | Asao | |
| 6,011,343 A | 1/2000 | Taniguchi | |
| 6,201,335 B1 | 3/2001 | Higashino et al. | |
| 6,333,582 B1 | 12/2001 | Asao et al. | |
| 6,369,485 B1 | 4/2002 | Oohashi et al. | |
| 6,806,616 B2 | 10/2004 | Morikaku et al. | |
| 6,853,112 B2 | 2/2005 | Nakamura et al. | |
| 2004/0134464 A1 | 7/2004 | Morikaku et al. | |

FOREIGN PATENT DOCUMENTS

JP    2001-86715 A    3/2001

*Primary Examiner*—Karl Tamai
*Assistant Examiner*—David W. Scheuermann
(74) *Attorney, Agent, or Firm*—Sughrue Mion, PLLC (57) ABSTRACT

Reinforcing body retainers are formed on an inner peripheral surface near a tip and near a root of first and second claw-shaped magnetic poles. Reinforcing bodies have a trapezoidal base portion and a pair of wing portions formed on two sides of the base portion, and slits are formed completely across a width direction of the base portion at a central portion in a height direction of the trapezoidal shape of the base portion so as to be offset toward a base of the trapezoidal shape. The reinforcing bodies are disposed so as to contact the inner peripheral surfaces of the first and second claw-shaped magnetic poles with a magnet housed and supported in each of the wing portions, and a D ring is fitted into the slits of the reinforcing bodies.

1 Claim, 5 Drawing Sheets

FIG. 10B

DYNAMOELECTRIC CLAW-SHAPED ROTOR WITH MAGNET RETAINER

This is a divisional of application Ser. No. 10/999,958 filed Dec. 1, 2004 now U.S. Pat. No. 7,259,489. The entire disclosure(s) of the prior application(s), application Ser. No. 10/999,958 is considered part of the disclosure of the accompanying divisional application and is hereby incorporated by reference.

BACKGROUND OF THE INVENTION

1. Field of the Invention

The present invention relates to a dynamoelectric rotor construction for an alternator, an electric motor, etc., and particularly to a mounting construction for magnets for preventing magnetic flux leakage between claw-shaped magnetic poles.

2. Description of the Related Art

In conventional automotive dynamoelectric rotors, there are provided: magnets disposed on two side surfaces of claw-shaped magnetic poles to reduce leakage of magnetic flux between the side surfaces of adjacent claw-shaped magnetic poles; and reinforcing bodies for supporting the magnets so as to be inclined such that outer peripheral sides spread away from each other. The reinforcing bodies are for reducing centrifugal force acting during rotation of the rotor, and are pressed against the claw-shaped magnetic poles from an inner peripheral side by a ring-shaped restraining member. (See Patent Literature 1, for example.)

Patent Literature 1: Japanese Patent Laid-Open No. 2001-86715 (Gazette)

In conventional automotive dynamoelectric rotors, positioning of the reinforcing bodies supporting the magnets relative to a rotor core assembly is not regulated. Thus, one disadvantage has been that when the reinforcing bodies are pressed against the claw-shaped magnetic poles from the inner peripheral side using the ring-shaped restraining member, it is necessary for the reinforcing bodies to be held using an adhesive or a jig, making assembly difficult. Another disadvantage has been that if the claw-shaped magnetic poles spread during high-speed rotation, the reinforcing bodies supporting the magnets may become misaligned, or dislodge, etc.

SUMMARY OF THE INVENTION

The present invention aims to solve the above problems and an object of the present invention is to provide a dynamoelectric rotor enabling assembly to be improved, and also preventing reinforcing bodies for supporting magnets from misaligning or dislodging, etc., even if claw-shaped magnetic poles spread during high-speed rotation, by disposing a retainer for preventing movement of the reinforcing bodies toward a tip of the claw-shaped magnetic poles to enable a ring-shaped restraining member to be mounted so as to press the reinforcing bodies against the claw-shaped magnetic poles from an inner peripheral side without using an adhesive or a jig.

In order to achieve the above object, a dynamoelectric rotor of the present invention includes a rotor coil for generating a magnetic flux; and first and second pole core bodies disposed so as to cover the rotor coil, each including a plurality of claw-shaped magnetic poles projecting so as to alternately intermesh with each other. Also, provided are a plurality of magnets disposed near two side surfaces of the claw-shaped magnetic poles to reduce leakage of magnetic flux between the side surfaces of adjacent claw-shaped magnetic poles. Further, provided are a plurality of reinforcing bodies each including a base portion and a pair of wing portions formed on two sides of the base portions, the reinforcing bodies each being disposed such that the base portion comes into contact with an inner peripheral surface of the claw-shaped magnetic poles and the pair of wing portions faces the two side surfaces of the claw-shaped magnetic poles, the magnets being supported by the wing portions. Furthermore, provided are a ring-shaped restraining member for supporting the reinforcing bodies by pressing the base portion of each of the reinforcing bodies onto the inner peripheral surface of the claw-shaped magnetic poles from an inner peripheral side, and a retainer for preventing the reinforcing bodies from dislodging toward a tip of the claw-shaped magnetic poles.

According to the present invention, because movement of the reinforcing bodies toward a tip of the claw-shaped magnetic poles is prevented by a retainer, the reinforcing bodies do not move toward the tips of the claw-shaped magnetic poles when the ring-shaped restraining member is mounted so as to press the reinforcing bodies against the claw-shaped magnetic poles from an inner peripheral side. Thus, it is no longer necessary for the reinforcing bodies to be held by an adhesive or a jig during mounting of the restraining member, improving assembly. Movement of the reinforcing bodies toward the tip of the claw-shaped magnetic poles is also prevented even if the claw-shaped magnetic poles spread during high-speed rotation, preventing the reinforcing bodies from misaligning or dislodging, etc.

DETAILED DESCRIPTION OF THE PREFERRED EMBODIMENTS

Preferred embodiments of the present invention will now be explained with reference to the drawings.

Embodiment 1

Figure 1:
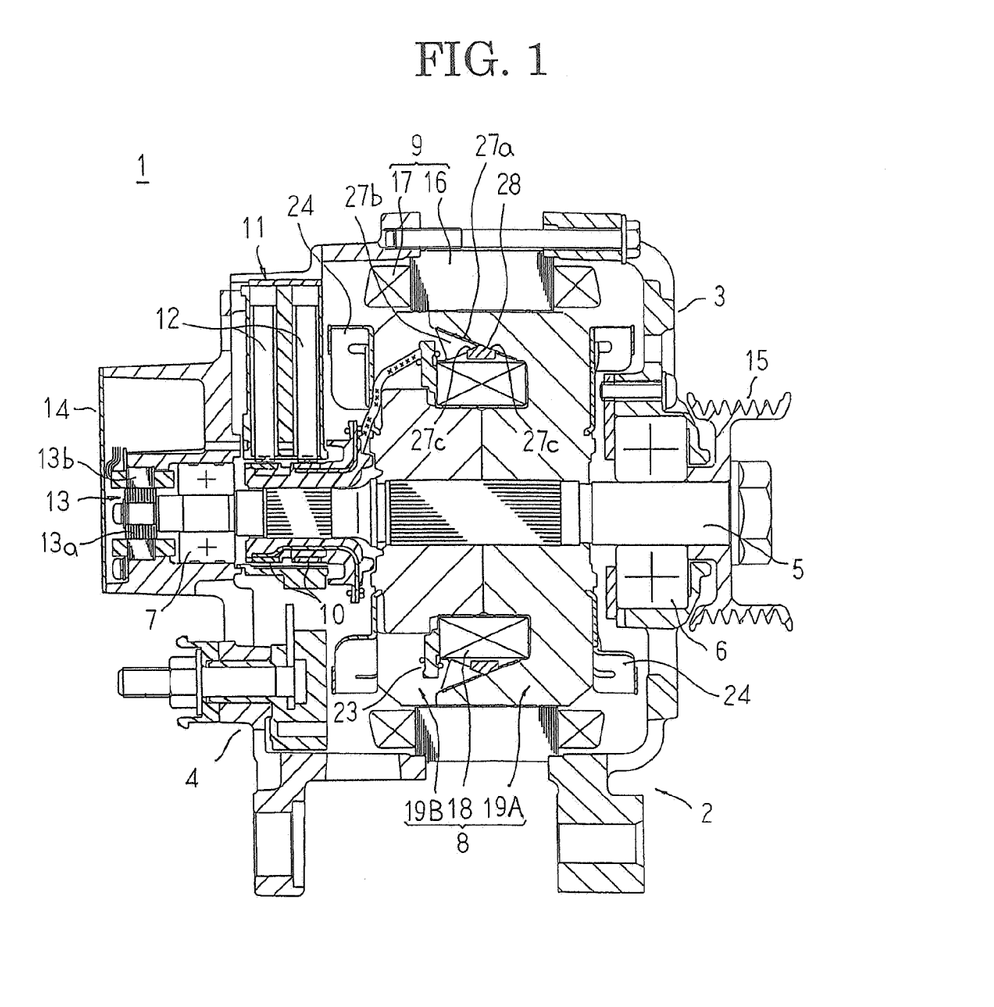
FIG. 1 is a longitudinal section showing an automotive dynamoelectric machine according to Embodiment 1 of the present invention.
Figure 2:
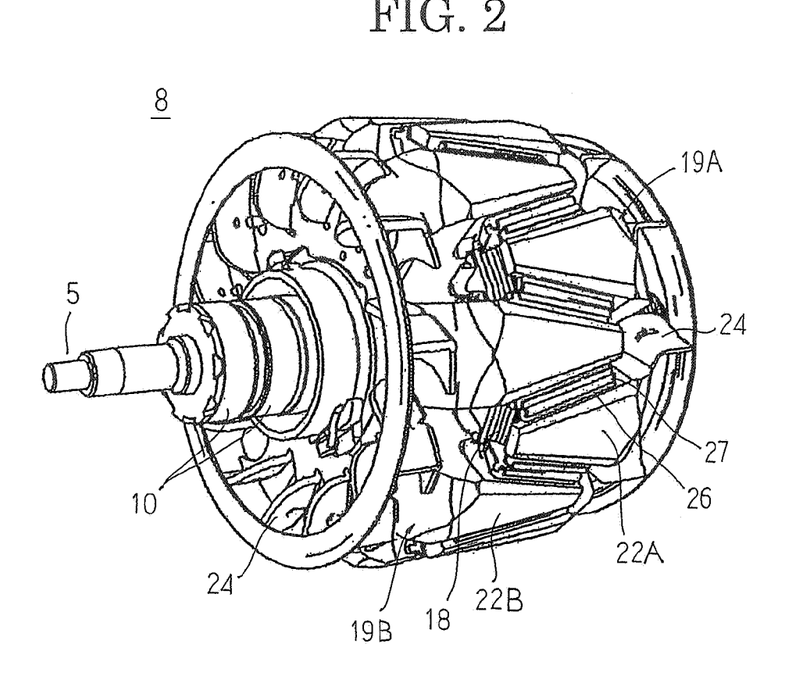
FIG. 2 is a perspective showing a rotor used in the automotive dynamoelectric machine according to Embodiment 1 of the present invention.
Figure 3:
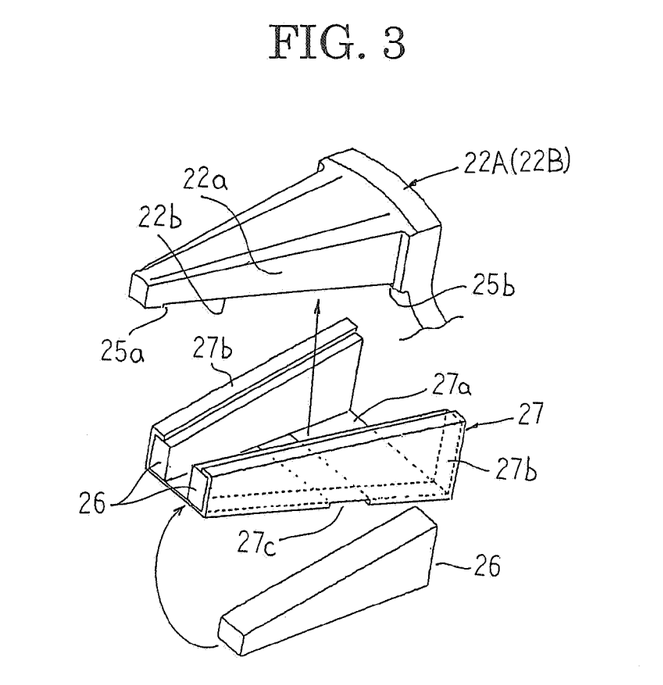
FIG. 3 is an exploded perspective explaining a mounting construction for magnets in the rotor used in the automotive dynamoelectric machine according to Embodiment 1 of the present invention.
Figure 4:
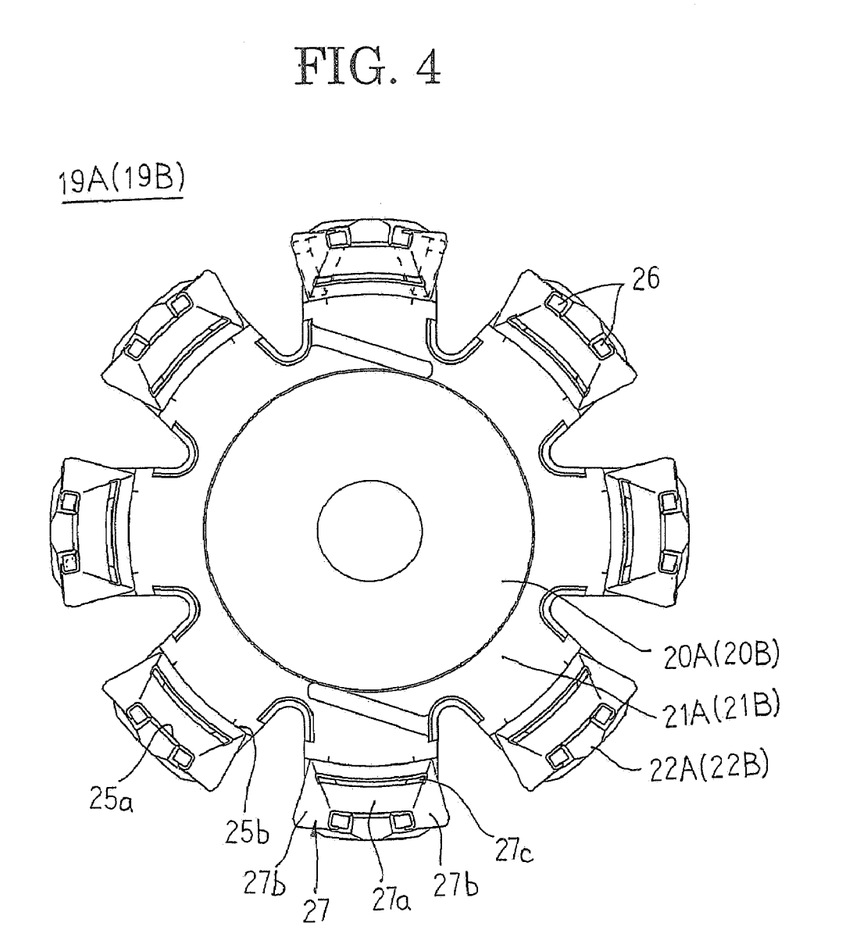
FIG. 4 is a front elevation showing a pole core body of the rotor used in the automotive dynamoelectric machine according to Embodiment 1 of the present invention.

FIG. 1 is a longitudinal section showing an automotive dynamoelectric machine according to Embodiment 1 of the present invention, FIG. 2 is a perspective showing a rotor used in the automotive dynamoelectric machine according to Embodiment 1 of the present invention, FIG. 3 is an exploded perspective explaining a mounting construction for magnets in the rotor used in the automotive dynamoelectric machine according to Embodiment 1 of the present invention, and FIG. 4 is a front elevation showing a pole core body of the rotor used in the automotive dynamoelectric machine according to Embodiment 1 of the present invention.

In FIGS. 1 to 4, an automotive dynamoelectric machine 1 includes: a housing 2 composed of a front bracket 3 and a rear bracket 4, each being generally cup-shaped and made of aluminum; a shaft 5 rotatably supported in the housing 2 by means of front-end and rear-end bearings 6 and 7; a rotor 8 fixed to the shaft 5 and rotatably disposed inside the housing 2; a stator 9 held by an inner wall surface of the housing 2 so as to surround the rotor 8; a pair of slip rings 10 disposed on an outer periphery of the shaft 5 at a position axially inside the rear-end bearing 7; a brush holder 11 disposed at an outer periphery of the slip rings 10; brushes 12 disposed inside the brush holder 11 so as to slide in contact with each of the slip rings 10; a rotor position detecting apparatus 13 disposed axially outside the rear-end bearing 7 for detecting a relative position of the rotor 8 relative to the stator 9; an end plate 14 fastened to the rear bracket 4 so as to cover the rotor position detecting apparatus 13; and a pulley 15 fixed to an end portion of the shaft 5 projecting axially outside the front-end bearing 6.

The stator 9 includes: a stator core 16 disposed so as to be held between the front bracket 3 and the rear bracket 4 and surround the rotor 8; and a three-phase stator coil 17 installed in the stator core 16.

The rotor 8 includes: a rotor coil 18 for generating a magnetic flux on passage of an electric current; and first and second pole core bodies 19A and 19B made of iron disposed so as to cover the rotor coil 18, magnetic poles being formed in the first and second pole core bodies 19A and 19B by the magnetic flux from the rotor coil 18. The first pole core body 19A includes: a cylindrical first boss portion 20A; a first yoke portion 21A disposed so as to extend radially outward from a first axial end of the first boss portion 20A; and first claw-shaped magnetic poles 22A each disposed so as to extend toward a second axial end from the first yoke portion 21A. The second pole core body 19B includes: a cylindrical second boss portion 20B; a second yoke portion 21B disposed so as to extend radially outward from a second axial end of the second boss portion 20B; and second claw-shaped magnetic poles 22B each disposed so as to extend toward a first axial end from the second yoke portion 21B. Eight first claw-shaped magnetic poles 22A and eight second claw-shaped magnetic poles 22B, for example, are each arranged at a predetermined pitch in a circumferential direction. In addition, each of the first and second claw-shaped magnetic poles 22A and 22B are formed such that radially-outermost peripheral surfaces thereof form a trapezoidal shape constituted by a tip end circumferential short side, a base end portion circumferential long side, and two oblique sides, and circumferential side surfaces 22a thereof are each formed so as to have a tapered shape constituted by a tip end radial short side, an oblique side constituting the outermost peripheral surface, and an oblique side joining a lower end of the tip end radial short side and an inner peripheral root portion of the first and second claw-shaped magnetic poles 22A and 22B. The first and second pole core bodies 19A and 19B are integrated by abutting a second end surface of the first boss portion 20A and a first end surface of the second boss portion 20B, disposing the first and second claw-shaped magnetic poles 22A and 22B so as to intermesh with each other, and pressing the shaft 6 through a central axial position of the first and second boss portions 20A and 20B.

Moreover, inner peripheral surfaces 22b of the first and second claw-shaped magnetic poles 22A and 22B form a trapezoidal shape in a similar manner to that of the outermost peripheral surfaces, and are formed into inclined surfaces extending radially outward from a root toward a tip. The rotor coil 18 is wound onto a bobbin 23 mounted to the first and second boss portions 20A and 20B, and is covered by the first and second claw-shaped magnetic poles 22A and 22B. In addition, fans 24 are fixed to two axial end surfaces of the first and second pole core bodies 19A and 19B.

First and second reinforcing body retainers 25a and 25b functioning as retainers are formed by projecting portions of the inner peripheral surfaces 22b near a root end and near a tip of the first and second claw-shaped magnetic poles 22A and 22B radially inward. A magnet 26 is a neodymium magnet produced into a bulk body having a cross-sectional shape generally equivalent to the shape of the side surfaces 22a of the first and second claw-shaped magnetic poles 22A and 22B.

A reinforcing body 27 is formed by bending a stainless alloy plate having a thickness of approximately 1 mm, and has: a trapezoidal base portion 27*a* that comes into contact with an inner peripheral surface 22*b* of the first and second claw-shaped magnetic poles 22A and 22B; and a pair of wing portions 27*b* formed on two sides of the base portion 27*a*. The wing portions 27*b* each have an angular C shape, and are formed on the two side edges of the base portion 27*a* such that open ends of the angular C shapes face each other. A slit 27*c* having a predetermined width functioning as a retainer is formed completely across a width direction of the base portion 27*a* at a central portion in a height direction (a longitudinal direction) of the trapezoidal shape of the base portion 27*a* so as to be offset toward a base end of the trapezoidal shape. Moreover, a length of the base portion 27*a* is generally equal to or slightly less than a distance between the first and second reinforcing body retainers 25*a* and 25*b*.

A D ring 28 functioning as a restraining member is made of a stainless alloy, for example, and is a ring body having a pentagonal cross section having a slightly larger outside diameter than an intersecting portion of the inner peripheral surfaces 22*b* of the first and second claw-shaped magnetic poles 22A and 22B.

The reinforcing bodies 27 are disposed so as to contact the inner peripheral surface 22*b* of each of the first and second claw-shaped magnetic poles 22A and 22B with the magnet 26 housed and supported in each of the wing portions 27*b*. In addition, the D ring 28 is fitted into the intersecting portions of the inner peripheral surfaces 22*b* of the first and second claw-shaped magnetic poles 22A and 22B. Thus, the reinforcing bodies 27 are mounted such that the base portions 27*a* are pressed onto the inner peripheral surfaces 22*b* by the D ring 28. At this time, the reinforcing bodies 27 fit between the first and second reinforcing body retainers 25*a* and 25*b*, regulating axial movement. In addition, an outer peripheral portion of the D ring 28 fits together with the slits 27*c* of the reinforcing bodies 27 mounted to the first claw-shaped magnetic poles 22A and the slits 27*c* of the reinforcing bodies 27 mounted to the second claw-shaped magnetic poles 22B, also regulating axial movement of the reinforcing bodies 27. The magnets 26 are disposed so as to face each of the side surfaces 22*a* of the first and second claw-shaped magnetic poles 22A and 22B in close contact or with a slight clearance, and each is magnetized so as to reduce magnetic flux leakage between the first and second claw-shaped magnetic poles 22A and 22B. In other words, the magnets 26 are magnetized so as to match a polarity arising in the first and second claw-shaped magnetic poles 22A and 22B contacting them circumferentially.

To assemble the rotor 8 configured in this manner, first the first pole core body 19A is disposed with the tips of the first claw-shaped magnetic poles 22A pointing upward, and the reinforcing body 27 with magnets 26 housed and supported in the wing portions 27*b* is mounted to each of the first claw-shaped magnetic poles 22A. Thus, the base portions 27*a* are placed in close contact with the inner peripheral surfaces 22*b* of the first claw-shaped magnetic poles 22A, the wing portions 27*b* face the circumferential side surfaces 22*a*, and the base portions 27*a* are disposed between the first and second reinforcing body retainers 25*a* and 25*b* of the inner peripheral surfaces 22*b*. The inner peripheral surfaces 22*b* of the first claw-shaped magnetic poles 22A have a splayed shape, and the reinforcing bodies 27 are held without falling off the first claw-shaped magnetic poles 22A.

Next, the D ring 28 is lowered along the base portions 27*a* of each of the reinforcing bodies 27 from above, and insert into the slits 27*c*. At this time, pressure from the D ring 28 acts so as to move the reinforcing bodies 27 along the inner peripheral surfaces 22*b* toward the tips. The pressure from the D ring 28 is received by the base portions 27*a* of the reinforcing bodies 27 coming into contact with the first reinforcing body retainers 25*a*, and the base portions 27*a* of the reinforcing bodies 27 are pressed against the inner peripheral surfaces 22*b*. Thus, a pole core assembly is obtained in which the magnets 26, the reinforcing bodies 27, and the D ring 28 are installed in the first pole core body 19A.

Next, the second pole core body 19B is disposed with the tips of the second claw-shaped magnetic poles 22B pointing upward, and the reinforcing body 27 with magnets 26 housed and supported in the wing portions 27*b* is mounted to each of the second claw-shaped magnetic poles 22B. In addition, a bobbin 23 onto which the rotor coil 18 has been wound is mounted to the second boss portion 20B on the second pole core body 19B.

Then, the pole core assembly is positioned above the second pole core body 19B such that the first and second claw-shaped magnetic poles 22A and 22B intermesh with each other, and the pole core assembly is lowered to place the first boss portion 20A in contact with the second boss portion 20B. Thus, the D ring 28 is inserted into the slits 27*c* of the reinforcing bodies 27 mounted to each of the second claw-shaped magnetic poles 22B, and the first boss portion 20A is inserted into the bobbin 23. Thereafter, the shaft 5 is pressed into the first and second boss portions 20A and 20B, completing assembly of the rotor 8.

Operation of an automotive dynamoelectric machine 1 configured in this manner when used as an electric motor will now be explained.

During starting of an engine, an alternating current is supplied sequentially to each phase of the three-phase stator coil 17 by a three-phase drive circuit (not shown), and a field current is supplied to the rotor coil 18 by means of the brushes 12 and the slip rings 10. Thus, the stator coil 17 and the rotor coil 18 become electromagnets, and the rotor 8 rotates inside the stator 9 together with the shaft 5. Torque from the shaft 5 is transmitted to an output shaft of an engine (not shown) by means of the pulley 15, starting the engine.

At this time, a sensor rotor 13*a* of the rotor position detecting apparatus 13 rotates together with the rotation of the shaft 5. Thus, a gap permeance between the sensor rotor 13*a* and a sensor core 13*b* changes sinusoidally with angle. When an excitation voltage is applied to an excitation coil of a sensor coil (not shown) from outside, output voltages are output to first and second output coils (not shown). These two phases of output voltage are output to an external control apparatus (not shown) and converted to a rotation angle. Then, the control apparatus controls the alternating current supplied sequentially to each of the phases of the three-phase stator coil 17 such that the direction of rotation of the rotor 8 is constant and a predetermined rotational frequency is achieved.

Next, operation of the automotive dynamoelectric machine 1 when used as a generator will be explained.

Once the engine has been started, torque from the engine is transmitted to the shaft 5 by means of the pulley 15, rotating the shaft 5. Thus, when a field current is supplied to the rotor coil 18 by means of the brushes 12 and the slip rings 10, the rotor coil 18 is excited and becomes an electromagnet. By rotating the rotor 8 inside the stator 9 in this state, an alternating current is induced sequentially in the stator coil 17 installed in the stator core 16 and a generated voltage rises rapidly. This three-phase alternating current is input into a three-phase rectifying circuit (not shown) and rectified into a direct current. The direct-current voltage rectified by the three-phase rectifying circuit charges a battery (not shown) and is supplied to an electric load (not shown).

According to Embodiment 1, the first reinforcing body retainers 25a are formed by disposing tip ends of the inner peripheral surfaces 22b of the first and second claw-shaped magnetic poles 22A and 22B so as to project radially inward. Thus, the reinforcing bodies 27 mounted to the first and second claw-shaped magnetic poles 22A and 22B engage with the first reinforcing body retainers 25a (a difference in level between the inner peripheral surfaces 22b and the first reinforcing body retainers 25a), and are prevented from moving toward the tips of the first and second claw-shaped magnetic poles 22A and 22B. Thus, even if the first and second claw-shaped magnetic poles 22A and 22B spread during high-speed rotation of the rotor 8, the reinforcing bodies 27 are prevented from misaligning or dislodging, etc.

In addition, because the pressure from the D ring 28 acting so as to move the reinforcing bodies 27 along the inner peripheral surfaces 22b toward the tips is received by the first reinforcing body retainers 25a, radial movement of the reinforcing bodies 27 is prevented, and the holding strength of the reinforcing bodies 27 against the first and second claw-shaped magnetic poles 22A and 22B is also increased. Thus, the reinforcing bodies 27 are prevented from misaligning or dislodging, etc., during high-speed rotation of the rotor 8.

Because the slit 27c is formed in a base portion 27a of each of the reinforcing bodies 27, and the outer peripheral portion of the D ring 28 is configured so as to fit together with the slits 27c of the reinforcing bodies 27 when mounted to the first and second claw-shaped magnetic poles 22A and 22B, axial movement of each of the reinforcing bodies 27 is prevented. Thus, when the pressure from the D ring 28 acts on the reinforcing bodies 27, the reinforcing bodies 27 do not move along the inner peripheral surfaces 22b toward the tips of the first and second claw-shaped magnetic poles 22A and 22B. Thus, the base portions 27a of the reinforcing bodies 27 are pressed against the inner peripheral surfaces 22b of the first and second claw-shaped magnetic poles 22A and 22B by the D ring 28 in a state of contact, increasing the holding strength.

In this manner, radial and axial movement of the reinforcing bodies 27 is regulated, making the holding of the reinforcing bodies 27 during high-speed rotation reliable. Furthermore, it is no longer necessary to use an adhesive or a jig, etc., when the reinforcing bodies 27 are being mounted to the first and second claw-shaped magnetic poles 22A and 22B, improving assembly.

Because the pressure from the D ring 28 acting so as to move the reinforcing bodies 27 along the inner peripheral surfaces 22b toward the tips is received by the first reinforcing body retainers 25a, radial movement of the reinforcing bodies 27 is prevented. Thus, the pole core assembly can be obtained in which the magnets 26, the reinforcing bodies 27, and the D ring 28 are held by the first pole core body 19A without dislodging. Thus, because the rotor 8 can be assembled by producing a pole core assembly by mounting the magnets 26, the reinforcing bodies 27, and the D ring 28 to the first pole core body 19A, disposing a second pole core body 19B mounted with reinforcing bodies 27 below, and then lowering the pole core assembly toward the second pole core body 19B from above, assembly of the rotor 8 is improved.

The first and second reinforcing body retainers 25a and 25b are formed by projecting a root end and a tip end of the inner peripheral surfaces 22b of the first and second claw-shaped magnetic poles 22A and 22B radially inward so as to have a spacing generally matching the length of the base portions 27a of the reinforcing bodies 27. Thus, the reinforcing bodies 27 mounted to the first and second claw-shaped magnetic poles 22A and 22B engage with the first and second reinforcing body retainers 25a and 25b, preventing the reinforcing bodies 27 from moving axially on the first and second claw-shaped magnetic poles 22A and 22B. Thus, because the reinforcing bodies 27 are mounted so as to be positioned by the first and second claw-shaped magnetic poles 22A and 22B, and the position of the reinforcing bodies 27 is maintained during mounting of the D ring 28, adhesive or a jig for fixing the reinforcing bodies 27 to the first and second claw-shaped magnetic poles 22A and 22B is no longer necessary, improving the mountability of the D ring 28.

Moreover, in Embodiment 1 above, the reinforcing bodies 27 and the D ring 28 are made of a stainless alloy, but the reinforcing bodies 27 and the D ring 28 are not limited to being made of a stainless alloy, provided that a nonmagnetic material is used.

In Embodiment 1 above, reinforcing bodies 27 are used in which a pair of angular C-shaped wing portions 27b are formed on two sides of a base portion 27a such that openings of the angular C shapes face each other, but the reinforcing bodies are not limited to this shape provided that the magnets can be supported and, for example, reinforcing bodies in which a pair of U-shaped wing portions are formed on two sides of a base portion with openings of the U shapes facing downward (toward the rotor) are also acceptable.

Embodiment 2

Figures 5A, 5B:
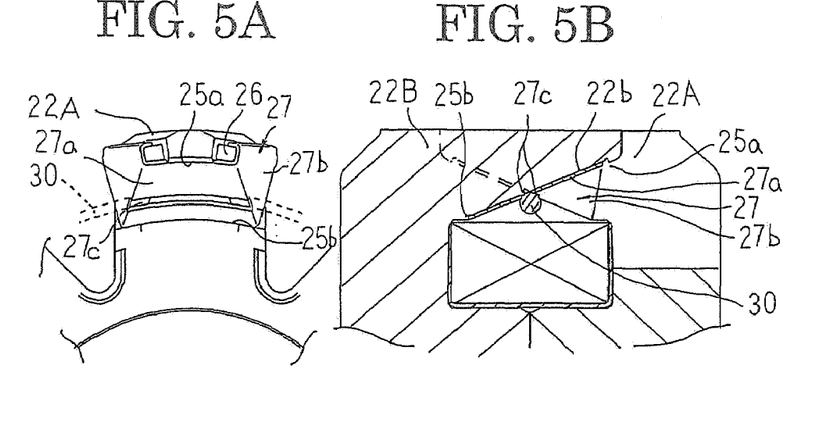
FIG. 5A is a front elevation showing part of a pole core body to explain a configuration of a rotor used in an automotive dynamoelectric machine according to Embodiment 2 of the present invention.
FIG. 5B is a cross section showing part of the rotor to explain the configuration of the rotor used in the automotive dynamoelectric machine according to Embodiment 2 of the present invention.

FIGS. 5A and 5B are diagrams explaining a configuration of a rotor used in an automotive dynamoelectric machine according to Embodiment 2 of the present invention, FIG. 5A being a front elevation showing part of a pole core body and FIG. 5B being a partial cross section showing part of the rotor.

In FIGS. 5A and 5B, a D ring 30 functioning as a restraining member is made of a stainless alloy, for example, and is a ring body having a circular cross section having a slightly larger outside diameter than an intersecting portion of inner peripheral surfaces 22b of first and second claw-shaped magnetic poles 22A and 22B.

Moreover, the rest of this embodiment is configured in a similar manner to Embodiment 1 above.

In Embodiment 2, the D ring 30 fits together with the slits 27c of the reinforcing bodies 27 mounted to the first claw-shaped magnetic poles 22A and the slits 27c of the reinforcing bodies 27 mounted to the second claw-shaped magnetic poles 22B, regulating axial movement of the reinforcing bodies 27.

Consequently, similar effects to those in Embodiment 1 above can also be achieved in Embodiment 2.

Furthermore, because the D ring 30 is made with a circular cross section, the ease of production is superior to that of a D ring 28 having a pentagonal cross section, enabling cost reductions.

Embodiment 3

Figure 6A:
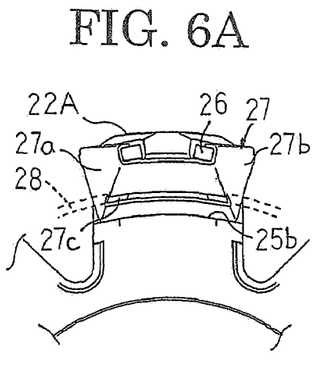
FIG. 6A is a front elevation showing part of a pole core body to explain a configuration of a rotor used in an automotive dynamoelectric machine according to Embodiment 3 of the present invention.
Figure 6B:
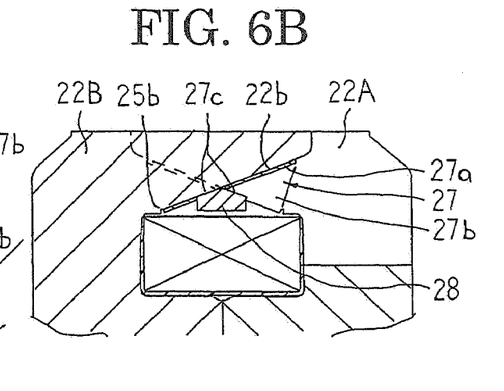
FIG. 6B is a cross section showing part of the rotor to explain the configuration of the rotor used in the automotive dynamoelectric machine according to Embodiment 3 of the present invention.

FIGS. 6A and 6B are diagrams explaining a configuration of a rotor used in an automotive dynamoelectric machine according to Embodiment 3 of the present invention, FIG. 6A being a front elevation showing part of a pole core body and FIG. 6B being a partial cross section showing part of the rotor.

In FIGS. 6A and 6B, first reinforcing body retainers 25a are eliminated, and only second reinforcing body retainers 25b are formed on inner peripheral surfaces 22b of first and second claw-shaped magnetic poles 22A and 22B.

Moreover, the rest of this embodiment is configured in a similar manner to Embodiment 1 above.

In Embodiment 3, the D ring 28 fits together with the slits 27c of the reinforcing bodies 27 when mounted to the first and second claw-shaped magnetic poles 22A and 22B, preventing axial movement of each of the reinforcing bodies 27.

Consequently, similar effects to those in Embodiment 1 above can also be achieved in Embodiment 3.

Furthermore, cost reductions are enabled compared to Embodiment 1 above by an amount proportionate to the elimination of the first reinforcing body retainers 25a.

Embodiment 4

Figure 7A:
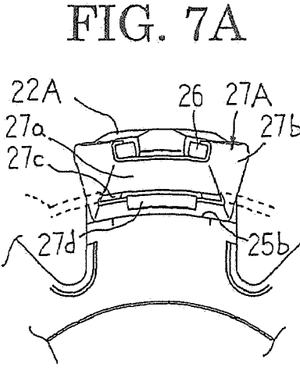
FIG. 7A is a front elevation showing part of a pole core body to explain a configuration of a rotor used in an automotive dynamoelectric machine according to Embodiment 4 of the present invention.
Figure 7B:
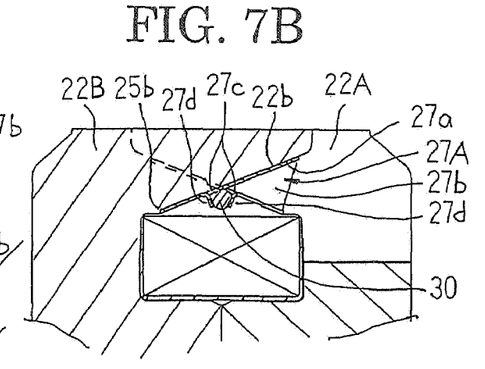
FIG. 7B is a cross section showing part of the rotor to explain the configuration of the rotor used in the automotive dynamoelectric machine according to Embodiment 4 of the present invention.

FIGS. 7A and 7B are diagrams explaining a configuration of a rotor used in an automotive dynamoelectric machine according to Embodiment 4 of the present invention, FIG. 7A being a front elevation showing part of a pole core body and FIG. 7B being a partial cross section showing part of the rotor.

In FIGS. 7A and 7B, a cut-and-raised segment 27d functioning as a retainer is formed by cutting and raising a portion of a base portion 27a of a reinforcing body 27A at an edge portion of a slit 27c on a base side of a trapezoidal shape of the base portion 27a so as to be generally at a right angle to the base portion 27a. Furthermore, first reinforcing body retainers 25a are eliminated, and only second reinforcing body retainers 25b are formed on inner peripheral surfaces 22b of first and second claw-shaped magnetic poles 22A and 22B.

Moreover, the rest of this embodiment is configured in a similar manner to Embodiment 2 above.

In Embodiment 4, a cut-and-raised segment 27d projects toward the rotor coil 18 from the base portion 27a of each of the reinforcing bodies 27A mounted to the first and second claw-shaped magnetic poles 22A and 22B. Each of the cut-and-raised segments 27d is disposed so as to extend in a circumferential direction. Thus, because the cut-and-raised segments 27d of the reinforcing bodies 27A mounted to the first claw-shaped magnetic poles 22A and the cut-and-raised segments 27d of the reinforcing bodies 27A mounted to the second claw-shaped magnetic poles 22B are arranged in rows so as to have the predetermined clearance in an axial direction, and the D ring 30 is engaged between the cut-and-raised segments 27d arranged in rows so as to have the predetermined clearance in an axial direction, axial movement of each of the reinforcing bodies 27A is prevented.

Consequently, similar effects to those in Embodiment 2 above can also be achieved in Embodiment 4.

Furthermore, cost reductions are enabled compared to Embodiment 2 above by an amount proportionate to the elimination of the first reinforcing body retainers 25a.

Embodiment 5

Figure 8A:
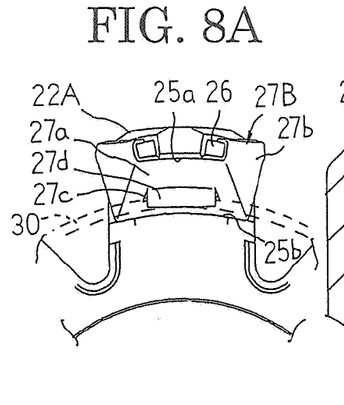
FIG. 8A is a front elevation showing part of a pole core body to explain a configuration of a rotor used in an automotive dynamoelectric machine according to Embodiment 5 of the present invention.
Figure 8B:
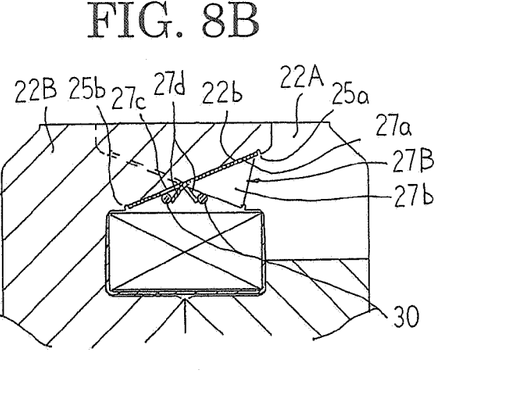
FIG. 8B is a cross section showing part of the rotor to explain the configuration of the rotor used in the automotive dynamoelectric machine according to Embodiment 5 of the present invention.

FIGS. 8A and 8B are diagrams explaining a configuration of a rotor used in an automotive dynamoelectric machine according to Embodiment 5 of the present invention, FIG. 8A being a front elevation showing part of a pole core body and FIG. 8B being a partial cross section showing part of the rotor.

In FIGS. 8A and 8B, a cut-and-raised segment 27d functioning as a retainer is formed by cutting and raising a portion of a base portion 27a of a reinforcing body 27B at an edge portion of a slit 27c on an apex side of a trapezoidal shape of the base portion 27a so as to be at an acute angle to the base portion 27a. Furthermore, two D rings 30 having a circular cross section are used instead of the D ring 28 having a pentagonal cross section.

Moreover, the rest of this embodiment is configured in a similar manner to Embodiment 1 above.

In Embodiment 5, a cut-and-raised segment 27d projects toward the rotor coil 18 from the base portion 27a of each of the reinforcing bodies 27B mounted to the first and second claw-shaped magnetic poles 22A and 22B. Each of the cut-and-raised segments 27d is disposed so as to extend in a circumferential direction. Here, the base portions 27a and the cut-and-raised segments 27d of the reinforcing bodies 27B mounted to the first claw-shaped magnetic poles 22A form an acute angle, and a D ring 30 is fitted between the base portions 27a and the cut-and-raised segments 27d. Similarly, the base portions 27a and the cut-and-raised segments 27d of the reinforcing bodies 27B mounted to the second claw-shaped magnetic poles 22B form an acute angle, and a D ring 30 is fitted between the base portions 27a and the cut-and-raised segments 27d. Thus, the two D rings 30 fitted between the base portions 27a and the cut-and-raised segments 27d are disposed side by side in an axial direction. Thus, axial movement of each of the reinforcing bodies 27B is prevented.

Consequently, similar effects to those in Embodiment 1 above can also be achieved in Embodiment 5.

In Embodiment 5, because a D ring 30 is fitted between the base portions 27a and the cut-and-raised segments 27d of the reinforcing bodies 27B mounted to the first claw-shaped magnetic poles 22A, the reinforcing bodies 27B are fixed to the first claw-shaped magnetic poles 22A. Similarly, because a D ring 30 is fitted between the base portions 27a and the cut-and-raised segments 27d of the reinforcing bodies 27B mounted to the second claw-shaped magnetic poles 22B, the reinforcing bodies 27B are fixed to the second claw-shaped magnetic poles 22B.

Here, a first pole core assembly is assembled by putting together a first pole core body 19A, magnets 26, reinforcing bodies 27B, and a D ring 30. Similarly, a second pole core assembly is assembled by putting together a second pole core body 19B, magnets 26, reinforcing bodies 27B, and a D ring 30. Then, a rotor can be assembled by positioning the first and second claw-shaped magnetic poles 22A and 22B so as to alternately intermesh with each other, and press-fitting the first and second pole core assemblies onto a shaft 5.

Thus, because the magnets 26, the reinforcing bodies 27B, and the D rings 30 are fixed to the first and second pole core bodies 19A and 19B, and the first and second pole core assemblies do not fall apart even if overturned, handling is facilitated, significantly improving assembly of the rotor.

Embodiment 6

Figure 9A:
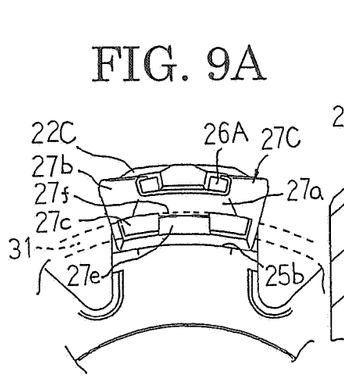
FIG. 9A is a front elevation showing part of a pole core body to explain a configuration of a rotor used in an automotive dynamoelectric machine according to Embodiment 6 of the present invention.
Figure 9B:
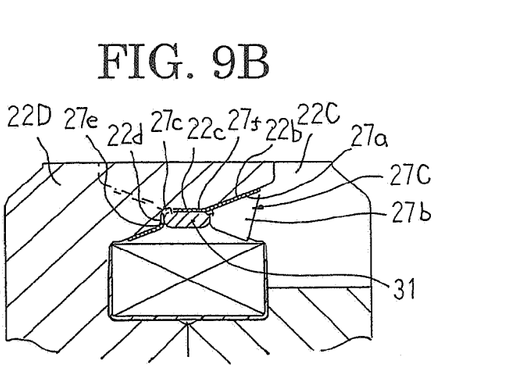
FIG. 9B is a cross section showing part of the rotor to explain the configuration of the rotor used in the automotive dynamoelectric machine according to Embodiment 6 of the present invention.

FIGS. 9A and 9B are diagrams explaining a configuration of a rotor used in an automotive dynamoelectric machine according to Embodiment 6 of the present invention, FIG.

9A being a front elevation showing part of a pole core body and FIG. 9B being a partial cross section showing part of the rotor.

In FIGS. 9A and 9B, first and second claw-shaped magnetic poles 22C and 22D are formed so as to have a step portion constituted by a first surface 22c and a second surface 22d by cutting away a central portion of an inner peripheral surface 22a. Here, the first surfaces 22c are formed into flat surfaces extending in a circumferential direction facing first and second boss portions 20A and 20B, and the second surfaces 22d are formed into flat surfaces extending in a circumferential direction so as to be generally perpendicular to the first surfaces 22c. Reinforcing body retainers 25a and 25b are eliminated. A magnet 26A is produced into a bulk body having a cross-sectional shape generally equivalent to the shape of the side surfaces 22a of the first and second claw-shaped magnetic poles 22C and 22D.

A slit 27c is formed completely across a width direction of a base portion 27a of a reinforcing body 27C at a central portion of the base portion 27a, a first segment 27e is formed by cutting and raising a portion of a base portion 27a at an edge portion of the slit 27c on a base side of a trapezoidal shape of the base portion 27a so as to be generally at a right angle to the base portion 27a, and in addition, a second segment 27f is formed by cutting and raising a portion of the base portion 27a at an edge portion of the slit 27c on an apex side of the trapezoidal shape of the base portion 27a so as to be at an acute angle to the base portion 27a. The first segments 27e are formed so as to lie alongside the second surfaces 22d of the step portions when the reinforcing bodies 27C are mounted to the first and second claw-shaped magnetic poles 22C and 22D. The second segments 27f are formed so as to lie alongside the first surfaces 22c of the step portions when the reinforcing bodies 27C are mounted to the first and second claw-shaped magnetic poles 22C and 22D. Here, a step portion constituted by the first segment 27e and the second segment 27f formed by deforming a portion of the base portion 27a of the reinforcing body 27C constitutes a retainer.

In addition, a D ring 31 having a rectangular cross section is used instead of a D ring 28 having a pentagonal cross section.

Moreover, the rest of this embodiment is configured in a similar manner to Embodiment 1 above.

In Embodiment 6, reinforcing bodies 27C are mounted to the first claw-shaped magnetic poles 22C such that the first segments 27e lie alongside the second surfaces 22d of the step portions, and the second segments 27f lie alongside the first surface 22c of the step portions. Similarly, reinforcing bodies 27C are mounted to the second claw-shaped magnetic poles 22D such that the first segments 27e lie alongside the second surfaces 22d of the step portions, and the second segments 27f lie alongside the first surface 22c of the step portions. Thus, the first segment 27e of each of the reinforcing bodies 27C mounted to the first claw-shaped magnetic poles 22C and the first segment 27e of each of the reinforcing bodies 27C mounted to the second claw-shaped magnetic poles 22D are arranged in rows so as to be separated from each other in an axial direction. The D ring 31 is fitted between the first segments 27e arranged in rows and separated from each other in an axial direction, preventing axial movement of the reinforcing bodies 27C. Pressure from the D ring 31 acts so as to press the second segments 27f against the first surfaces 22c of the first and second claw-shaped magnetic poles 22C and 22D, ensuring the holding strength of the reinforcing bodies 27C against the first and second claw-shaped magnetic poles 22C and 22D.

Consequently, similar effects to those in Embodiment 1 above can also be achieved in Embodiment 6.

Embodiment 7

Figure 10A:
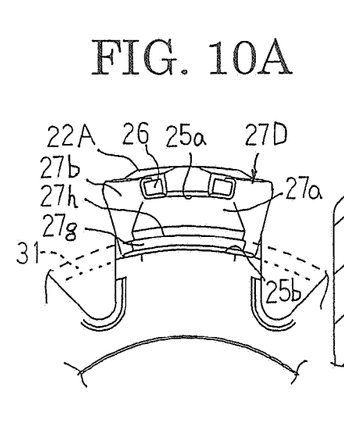
FIG. 10A is a front elevation showing part of a pole core body to explain a configuration of a rotor used in an automotive dynamoelectric machine according to Embodiment 7 of the present invention.
Figure 10B:
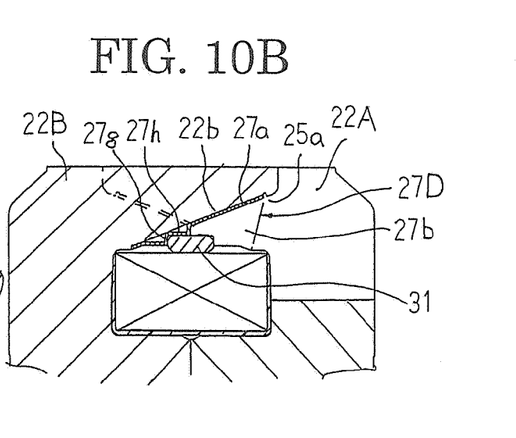
FIG. 10B is a cross section showing part of the rotor to explain the configuration of the rotor used in the automotive dynamoelectric machine according to Embodiment 7 of the present invention.

FIGS. 10A and 10B are diagrams explaining a configuration of a rotor used in an automotive dynamoelectric machine according to Embodiment 7 of the present invention, FIG. 10A being a front elevation showing part of a pole core body and FIG. 10B being a partial cross section showing part of the rotor.

In FIGS. 10A and 10B, a step portion functioning as a retainer constituted by a first segment 27g and a second segment 27h is formed by bending and shaping a base portion 27a of a reinforcing body 27D near a base end of a trapezoidal shape from a central portion of the base portion 27a. The second segments 27h are formed into flat surfaces extending in a circumferential direction facing first and second boss portions 20A and 20B when mounted to the first and second claw-shaped magnetic poles 22A and 22B. The first segments 27g are formed into flat surfaces extending in a circumferential direction generally perpendicular to the second segments 27h. The step portions constituted by the first segments 27g and the second segments 27h project from the base portions 27a toward a rotor coil 18.

A D ring 31 having a rectangular cross section is used instead of a D ring 28 having a pentagonal cross section.

Moreover, the rest of this embodiment is configured in a similar manner to Embodiment 1 above.

In Embodiment 7, the second segments 27h of the reinforcing bodies 27D mounted to the first claw-shaped magnetic poles 22A and the second segments 27h of the reinforcing bodies 27D mounted to the second claw-shaped magnetic poles 22B are positioned in a common plane, and the first segments 27g of the reinforcing bodies 27D mounted to the first claw-shaped magnetic poles 22A and the first segments 27g of the reinforcing bodies 27D mounted to the second claw-shaped magnetic poles 22B are arranged in rows so as to be separated in an axial direction.

The D ring 31 is fitted between the first segments 27g arranged in rows and separated from each other in an axial direction, preventing axial movement of the reinforcing bodies 27D. Pressure from the D ring 31 acts so as to press the base portions 27a by means of the second segments 27h against the inner peripheral surfaces 22b of the first and second claw-shaped magnetic poles 22A and 22B, ensuring the holding strength of the reinforcing bodies 27D against the first and second claw-shaped magnetic poles 22A and 22B.

Consequently, similar effects to those in Embodiment 1 above can also be achieved in Embodiment 7.

What is claimed is:

1. A dynamoelectric rotor comprising:
a rotor coil for generating a magnetic flux;
first and second pole core bodies disposed so as to cover said rotor coil, each comprising a plurality of claw-shaped magnetic poles projecting so as to alternately intermesh with each other;
a plurality of magnets disposed near two side surfaces of said claw-shaped magnetic poles to reduce leakage of magnetic flux between said side surfaces of adjacent claw-shaped magnetic poles;
a plurality of reinforcing bodies each comprising a base portion and a pair of wing portions formed on two sides of said base portions, said reinforcing bodies each being disposed such that said base portion comes into contact with an inner peripheral surface of said claw-shaped magnetic poles and said pair of wing portions faces said two side surfaces of said claw-shaped magnetic poles, said magnets being supported by said wing portions;

a ring-shaped restraining member for supporting said reinforcing bodies by pressing said base portion of each of said reinforcing bodies onto said inner peripheral surface of said claw-shaped magnetic poles from an inner peripheral side; and a retainer for preventing said reinforcing bodies from dislodging toward a tip of said claw-shaped magnetic poles, wherein said retainer is disposed on said base portion of said reinforcing bodies, wherein a slit is formed on said base portion of said reinforcing bodies, and wherein said retainer is a cut-and-raised segment comprising a part of said base portion formed by bending at an edge portion of said slit on an apex side of said base portion so as to be at an acute angle to said base portion or by bending at an edge portion of said slit on a base side of said base portion so as to be at a right angle to said base portion, said part of said base portion extending in a circumferential direction toward said rotor coil, and said restraining member being engaged by said cut-and-raised segment.

* * * * *